3,342,676
DERMATOLOGICAL COMPOSITION CONTAINING 21-DESOXY-9-ALPHA-FLUORO-6-METHYL PREDNISOLONE
Ladislaus Desiderius Aladarus Szabo and Birgit Yrsa Keimer, Copenhagen, Denmark, assignors to The Upjohn Company, Kalamazoo, Mich., a corporation of Delaware
No Drawing. Filed Nov. 25, 1964, Ser. No. 413,977
3 Claims. (Cl. 167—58)

The present invention relates to a novel steroid composition for topical application and a method of treating skin diseases.

There has for some years been a constant search for new corticosteroids being as effective as hydrocortisone, but not having the side effects of this well known steroid. Some years ago, as a result of this search, the compound 21-desoxy-9α-fluoro-6-methylprednisolone (in the following named by the generic name "fluorometholone") appeared as a topically applicable steroid having market anti-inflammatory activity. Although fluorometholone contains a 9α-fluoro-configuration, its administration does not result in sodium and water retention typical of 9α-fluoro-hydrocortisone. Clinical evaluation in humans demonstrated this observation originally made in animal studies. Doses were given orally and intravenously to determine the effect of fluorometholone on electrolyte and nitrogen metabolism. With oral doses of 2–10 mg. per day, there was no evidence of any effect on electrolyte regulation or of any increased nitrogen excretion. Further studies were conducted with 14 mg. of fluorometholone given by i.v. drip over an 8-hour period. Even at this intravenous dosage level, little or no effect was seen on electrolyte or nitrogen balance.

The topical evaluation of fluorometholone as an anti-inflammatory agent demonstrated that it was an extremely potent steroid when applied topically. When effects of oral administration in man were subsequently evaluated, the anti-inflammatory activity was found to be only 1–3 times greater than that of hydrocortisone given by mouth. However, when applied topically in human studies, fluorometholone was shown to have an activity 40 times greater than that of hydrocortisone. This inherent security against systemic side effects is considered of definite advantage in the treatment of chronic diseases of the skin and/or those affecting large areas. Classic examples are prurigo resnier, a chronic and recurrent disease and psoriasis, a chronic disease in the eruptive phase requiring penetrating anti-inflammatory steroid treatment.

Fluorometholone has been marketed as a topical anti-inflammatory steroid incorporated in a vehicle consisting essentially of glycerol monostearate, spermaceti, polyethylene glycol and purified water. Also an ointment containing fluorometholone and neomycin has been marketed. The vehicle includes liquid petrolatum, cholesterol, microcrystalline wax and white petrolatum.

These fluorometholone preparations, however, seem to fall short of what might be expected in respect to clinical efficacy when treating certain skin disorders, especially in the so-called occlusive treatment of psoriasis. This is rather surprising taking into consideration the very high topical anti-inflammatory activity of fluorometholone.

Working from the concept that the somewhat disappointing results might be due to the fact that the penetration of fluorometholone into the skin was unsatisfactory, we carried out a number of experiments with varying vehicles. Quite surprising it was found that some vehicles showed outstanding effects in comparative vasoconstriction tests as compared with commonly used solvents such as polyethylene glycol and glycerol.

The steroid compositions of the present invention take the shape of lotions or creams comprising a solution of fluorometholone in a solvent selected from the group consisting of 1,3-butanediol, diethyleneglycol monoethylether, propyleneglycol and polypropyleneglycol 400, possible with a fatty substance included, and a suitable preservative such as methylparaben, butyl-p-hydroxybenzoate, or the like. The steroid is preferably present in a concentration of about 0.01 percent to about 0.25%, all percentages here and hereinafter being expressed as percentages by weight. Lower or higher concentrations may well be used, the upper range, however, being limited by the solubility of fluorometholone in the particular vehicle.

The common characteristics of the solvents 1,3-butanediol, diethylene glycol monoethylether, propyleneglycol and polypropyleneglycol 400 are that they have low toxicity, low order of skin irritation, chemical structure showing both hydrophilic and lipophilic groups, miscibility with water, ability to dissolve fluorometholone. The solvent 1,3-butanediol fulfils these characteristics to a high degree and is especially suitable in the compositions according to the present invention. The solvent concentrations may vary from about 75 parts by weight to just below 100% as in case of pure solutions of fluorometholone. Mixtures of these solvents may very well be used and fall within the scope of the invention. While these solvents have been used previously in pharmaceutical preparations, they have not been suggested in connection with anti-inflammatory steroids.

As fatty substances according to the present invention may be used wool alcohol, wool fat, almond oil, cholesterol, or the like. They are according to the invention preferably used in an amount of from about zero to about 25 parts by weight. They are included in the compositions mostly to avoid drying and peeling of the skin as is frequently observed in psoriasis.

The following examples will illustrate compositions in accordance with the present invention, the scope of the invention not, however, being limited to the specific details of these examples.

Example 1

|  | Parts |
|---|---|
| Fluorometholone | 0.05 |
| 1,3-butanediol | 94.95 |
| Wool alcohol | 5.00 |

Example 2

|  | Parts |
|---|---|
| Fluorometholone | 0.05 |
| 1,3-butanediol | 89.95 |
| Wool alcohol | 10.00 |

Example 3

|  | Parts |
|---|---|
| Fluorometholone | 0.1 |
| Diethyleneglycol monoethylether | 89.9 |
| Wool fat | 10.0 |

Example 4

|  | Parts |
|---|---|
| Fluorometholone | 0.1 |
| 1,3-butanediol | 50.0 |
| Diethyleneglycol monoethylether | 49.9 |
| Almond oil | 10.0 |

Example 5

|  | Parts |
|---|---|
| Fluorometholone | 0.1 |
| Polypropyleneglycol 400 | 94.9 |
| Wool alcohol | 5.0 |

It is a further object of the present invention to provide a method of treating skin diseases which comprises the step of topically administering a sufficient amount of fluorometholone in a vehicle comprising 1,3-butanediol, diethyleneglycol monoethylether, propyleneglycol or polypropyleneglycol 400, possibly with a fatty substance included. Fluorometholone is preferably present in the vehicle in a concentration of from 0.01 to 0.25 part by weight.

The following comparative tests illustrate the efficacy of the compositions and the method according to the present invention. The test carried out was the so-called vasoconstriction test described by A. W. McKenzie et al. in Arch. Derm., 86, 608 (1962). It consists essentially in overnight application to the skin of the steroid composition in question using the occlusion technique. The result is read following 1–24 hours after the removal of the bandage as a pallor of the skin at the place of application and according to the degree of pallor the effect expressed as ++, +, (+) or −. In the experiments carried out, 16 tests were performed for each composition. The following solutions, each containing 0.1 part per weight of fluorometholone, were tested:

Polyethyleneglycol 400 _____ (4)
1,5-pentanediol _____ (8)
Propyleneglycol _____ (7)
Diethyleneglycol monoethylether _____ (6)
Polypropyleneglycol 400 _____ (3)

Also tested were solutions containing 0.05 parts per weight of fluorometholone in 1,3-butanediol (9) and glycerol (5). As a reference substance was used a commercial preparation of 6α,9α-difluor-11β,21-dihydroxy-3,20-dioxy-16α,17α-isopropylidene (SYNALAR® lotion).

The numbers in parentheses refer to code numbers used in the experiments and will be used in the following table:

TABLE 1

| Code number | Number of results | | | | Σ |
|---|---|---|---|---|---|
| | ++ | + | (+) | ÷ | |
| 4 * | | 5 | 2 | 9 | 16 |
| 8 | | 7 | | 9 | 16 |
| 5 | 1 | 6 | | 9 | 16 |
| 7 | | 11 | | 5 | 16 |
| 6 * | 1 | 11 | 2 | 2 | 16 |
| 3 | 4 | 8 | 1 | 3 | 16 |
| 9 | 5 | 9 | | 2 | 16 |
| Reference | | 12 | 1 | 3 | 16 |

The solvents marked with an asterisk caused each a single case of skin irritation, but it is apparent from the table that for instance the polyethyleneglycol 400 and glycerol compositions are quite surprisingly inferior to the compositions according to the present invention.

It is to be understood that the invention is not limited to the exact details of operation or exact compounds or compositions shown and described, as obvious modifications and equivalents will be apparent to one skilled in the art, and the invention is therefore to be limited only by the scope of the appended claims.

What we claim is:

1. A steroid composition for dermatological use which comprises 0.01–0.25 part by weight of 21-desoxy-9α-fluoro-6-methylprednisolone, 75 to 99.99 parts by weight of a solvent selected from the group consisting of diethyleneglycol monoethylether, and polypropyleneglycol 400, and zero to 25 parts by weight of a fatty substance selected from the group consisting of wool fat, wool alcohol, and almond oil.

2. A steroid composition for dermatological use which comprises 0.01–0.25 part by weight of 21-desoxy-9α-fluoro-6-methylprednisolone, 75 to 99.99 parts by weight of diethyleneglycol monoethylether, and zero to 25 parts by weight of a fatty substance selected from the group consisting of wool fat, wool alcohol, and almond oil.

3. A steroid composition for dermatological use which comprises 0.01–0.25 part by weight of 21-desoxy-9α-fluoro-6-methylprednisolone, 75 to 99.99 parts by weight of polypropyleneglycol 400, and zero to 25 parts by weight of a fatty substance selected from the group consisting of wool fat, wool alcohol, and almond oil.

References Cited

UNITED STATES PATENTS 2,978,379    4/1961    Shell _____ 167—58

OTHER REFERENCES

The Merck Index, 7th edition, 1960, page 863.

ALBERT T. MEYERS, Primary Examiner.

SAM ROSEN, Examiner.

D. R. MAHANAND, Assistant Examiner.